United States Patent [19]
Allison et al.

[11] 3,834,122
[45] Sept. 10, 1974

[54] METHOD AND APPARATUS FOR SEPARATING HYDROCARBONS

[75] Inventors: Jean B. Allison; Kadry K. Bissada; Christine M. Peterson, all of Houston, Tex.

[73] Assignee: Texaco Inc., New York, N.Y.

[22] Filed: Nov. 2, 1972

[21] Appl. No.: 302,716

[52] U.S. Cl............................. 55/33, 55/58, 55/179, 23/230 EP
[51] Int. Cl............................................. B01d 53/04
[58] Field of Search........... 55/67, 197, 386, 25, 26, 55/33, 58, 74, 179, 387; 23/230 EP, 232 C

[56] References Cited
UNITED STATES PATENTS

| | | |
|---|---|---|
| 2,694,923 | 11/1954 | Carpenter .................... 23/230 EP |
| 3,174,326 | 3/1965 | Carle et al. ............................. 55/67 |
| 3,242,651 | 3/1966 | Arnolti.................................... 55/75 |
| 3,264,803 | 8/1966 | Read...................................... 55/208 |
| 3,345,137 | 10/1967 | McAuliffe...................... 23/230 EP |
| 3,496,702 | 2/1970 | Carel et al. ............................. 55/67 |

*Primary Examiner*—Charles N. Hart
*Attorney, Agent, or Firm*—T. H. Whaley; C. G. Ries

[57] ABSTRACT

Means and method which provides for thermal desorption of gas, including light hydrocarbons, from an earthen sample. Carrier gas mingles with the desorbed gas to carry it to a dehydrating unit. After dehydration, the gas mixture is provided to a hydrocarbon trap which substantially separates the light hydrocarbons from the gas mixture. The hydrocarbon trap is then removed for analysis of the trapped light hydrocarbons.

9 Claims, 5 Drawing Figures

METHOD AND APPARATUS FOR SEPARATING HYDROCARBONS

BACKGROUND OF THE INVENTION

1. Field of the Invention

The present invention relates to apparatus and method for the desorption and trapping of light hydrocarbons for analysis purposes in general.

2. Description of the Prior Art

Heretofore, methods for the desorption and trapping of light hydrocarbons adsorbed by a material required tedious steps involving desorption by thermal means and trapping of hydrocarbons by simple condensation. Ethane was not quantitatively trapped by this technique. Furthermore, the prior technique required replacement of the dehydrating agent after each desorption.

The method and apparatus of the present invention desorbs volatile components from a material and quantitatively traps light hydrocarbons on adsorbents at cryogenic temperatures. Furthermore, the dehydrating agent is rejuvenated in situ instead of being replaced.

SUMMARY OF THE INVENTION

The apparatus and method of the present invention removes light hydrocarbons from an earthen sample. Gas, including the light hydrocarbons, is desorbed from the sample for a predetermined time in a device which is maintained at a predetermined temperature. During the desorbing process, carrier gas enters the device and carries the desorbed gas to a dehydrating unit. The gaseous mixture of desorbed gas and the carrier gas is dehydrated and provided to traps which substantially separates the light hydrocarbons from the gaseous mixture.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustrative purposes only and are not to be construed as defining the limits of the invention.

DESCRIPTION OF THE DRAWINGS

FIGS. 2, 3, and 4 are detailed drawings of the thermal desorption unit, the dehydration unit and the hydrocarbon trap, respectively, shown in FIG. 1.

DESCRIPTION OF THE INVENTION

Figure 1:
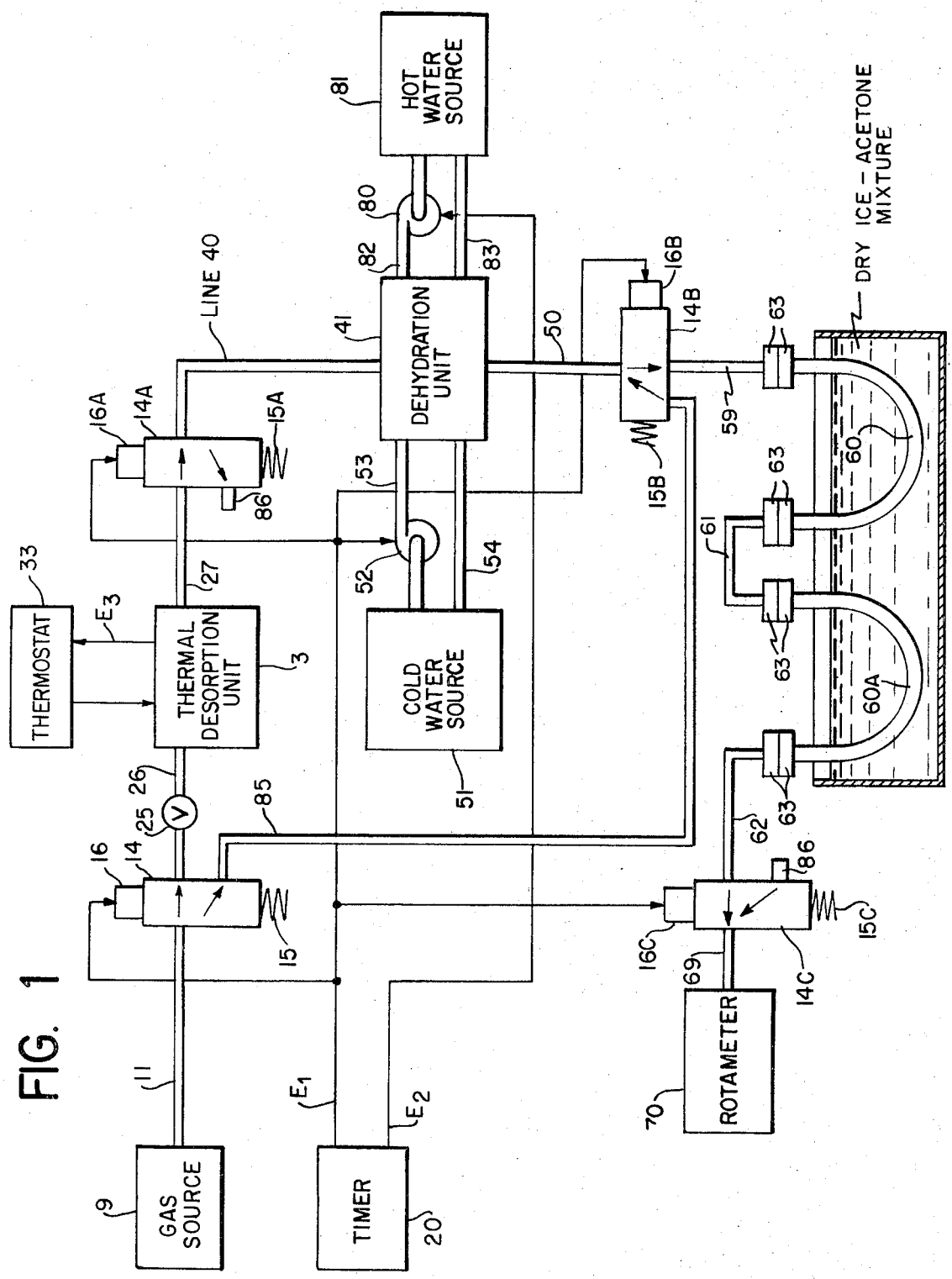
FIG. 1 is a simplified schematic diagram of apparatus, constructed in accordance with the present invention, for the trapping of a particular type of gas.

Referring to FIGS. 1 and 2, there is shown a hydrocarbon desorption unit which effectively removes light hydrocarbons from an earth sample. Light hydrocarbons, as used hereinbefore and hereinafter, shall mean those hydrocarbons that are in a gas state at the desorbing temperature. A sample of earth, which by way of example may come from an ocean floor, is placed in a sample boat (not shown). The sample boat is inserted in a sample chamber 1 of a thermal desorption unit 3 which is thereafter closed by a chamber plug 5. Thermal desorption is carried out at a predetermined temperature for a predetermined time interval. By way of example, the predetermined temperature may be 100°C while the predetermined time interval should be of such a duration to allow sufficient quantities of light hydrocarbons to be desorbed from the sample and quantitatively retained on an adsorbent. A gas source 9 provides a carrier gas, which may be helium, through a line 11 to a valve 14, having a spring 15 and a solenoid 16. Valve 14 controls the direction of the carrier gas.

Solenoid 16 is energized by alternating current voltage from a timer 20 which is activated by an operator. Timer 20 runs for the time interval and provides voltage $E_1$ and when not running provides another alternating current voltage $E_2$. Solenoids 16A through 16C of valves 14A through 14C, respectively, are also energized by voltage $E_1$. Elements having numbers with a suffix operate in a similar manner to elements having the same number without a suffix. With solenoid 16 energized, valve 14 passes the carrier gas to thermal desorption unit 3 through a needle valve 25 and a line 26. Needle valve 25 controls the flow rate of the carrier gas. The carrier gas enters chamber 1 and passes over the sample boat to carry away light hydrocarbon gases rising from the sample. The mixture of carrier gas and light hydrocarbons leaves thermal desorption unit by way of a line 27.

The temperature of sample chamber 1 is controlled by a chromolox strip heater 30. The temperature is sensed by a thermistor 31 which provides a signal $E_3$, corresponding to the sensed temperature, to a thermostat 33. Thermostat 33 energizes heater 30 when the chamber temperature has to be increased and does not energize heater 30 when the chamber temperature is substantially at the predetermined temperature.

Figure 3B:
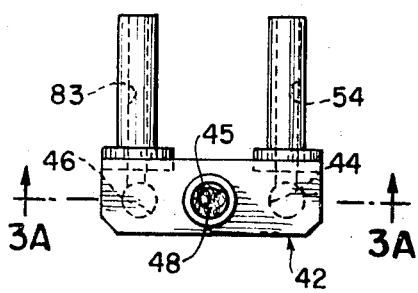
Figure 3A:
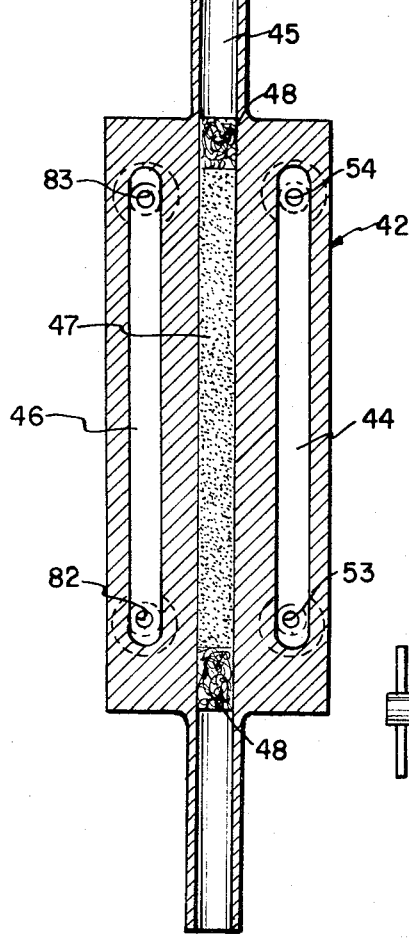
Figure 4:
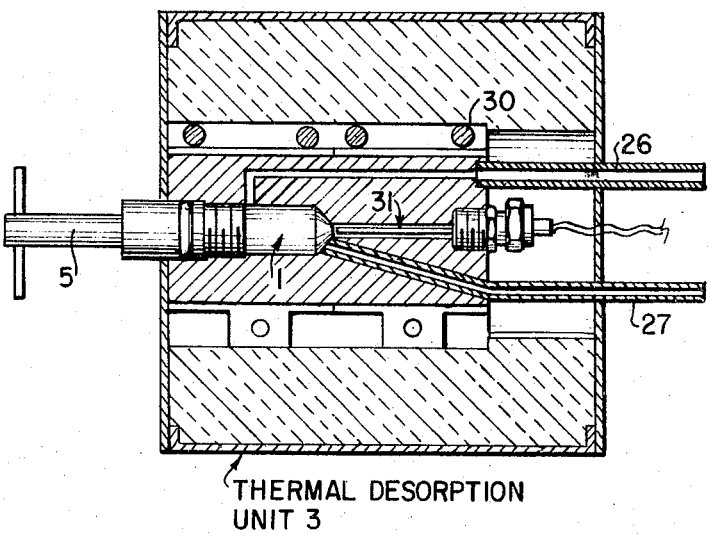

Since voltage $E_1$ is still present from timer 20, the gaseous mixture from thermal desorption unit 3 passes through valve 14A to enter a dehydration unit 41 through a line 40. Dehydration unit 41 is shown in greater detail in FIGS. 3A and 3B. Dehydration unit 41 is a modification of apparatus manufactured by the Teledyne-Interoceans Corporation as part of a hydrocarbon sniffing system. Dehydration unit 41 consists of an aluminum block 42 in which 3 tubular holes 44, 45 and 46 have been drilled longitudinally. A dehydrating agent 47 is packed into hole 45 which is connected to lines 40 and 50. By way of example, agent 47 may be Dowex 50 resin. Glass wool plugs 48 are inserted into hole 45 to retain agent 47.

The gaseous mixture passed by valve 14A passes through dehydrating agent 47, which is maintained at a predetermined temperature, which by way of example may lie within the range of 20°–30°C. Agent 47 is maintained at the predetermined temperature by passing cold water through a source 51 through hole 44. The cold water from source 51 is pumped by a pump 52 to dehydration unit 41 through a line 53 and returns to the source 51 by way of a line 54. Pump 52 is energized by voltage $E_1$ so that the cooling of dehydrating unit 41 occurs during the testing of the sample. The dehydrated gaseous mixture from dehydration unit 41 passes through line 50 and through valve 14B to a hydrocarbon trap 60 which is connected to lines 59 and 61 by quick disconnect self sealing connectors 63.

Figure 4:
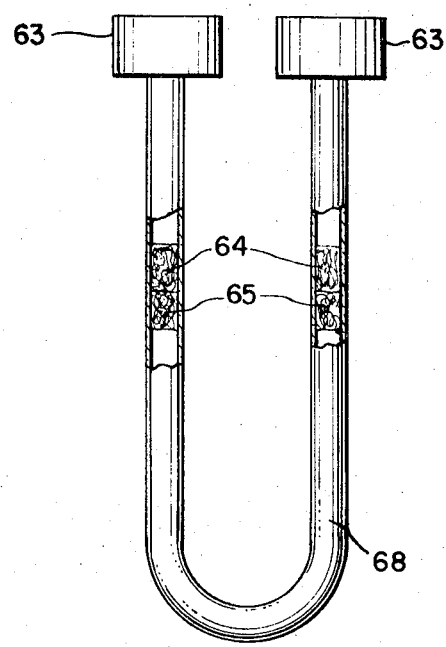

Referring now to FIG. 4, the gas from dehydrating unit 41 passes through brass gauze 64, glass wool 65 in trap 60 and enters an adsorbent 68. The adsorbent may be activated alumina. Adsorbent 68 traps light hydrocarbon gases, which are heavier than methane in molecular weight, out of the mixture at −79°C. By way of example, trap 60 may be placed in a dry ice-acetone mixture while trapping the light hydrocarbons to achieve the −79°C. The non-trapped gases of the mixture pass through the adsorbent 68 through glass wool 65 and brass gauze 64 to line 61.

The gas from trap 60 passes through line 61 to another trap 60A which is similar to trap 60 but it has a different adsorbent to trap methane. For purpose of illustration, the different adsorbent may be activated charcoal. The gas from trap 60A passes through lines 62 and 69, and through energized valve 14C to enter a rotameter 70 which provides a reading corresponding to the flow rate of the gas in line 69.

After the predetermined time interval, timer 20 no longer provides voltage $E_1$. Hydrocarbon traps 60, 60A are disconnected from lines 59, 61 and 62 so that the trapped light hydrocarbons may be analyzed by gas chromatography.

Agent 47 in hole 45 of dehydration unit 41 is rejuvenated to the anhydrous state by purging agent 47 with a stream of dry gas at a second predetermined temperature which by way of example may lie within a range of 70° to 90°C. This is accomplished automatically by timer 20 which upon the completion of the predetermined time interval no longer provides voltage $E_1$ but provides voltage $E_2$ to a pump 80. Pump 80 pumps hot water from a source 81 through hole 46 of dehydrating unit 41 to raise the temperature of dehydrating unit 41 to the second predetermined temperature. Since $E_1$ no longer energizes solenoids 16 through 16C, valves 14 through 14C, respectively, return to the de-energized state due to springs 15 through 15C respectively. The carrier gas from source 9 is diverted to a line 85 and from line 85 to line 50 by valves 14 and 14B, respectively. Thus, dry gas enters dehydrating unit 41 in an opposite direction to the gas flow during the testing thereby purging agent 47 in dehydrating unit 41. The purged gas from dehydrating unit 41 passes through line 40 to valve 14A which vents the purged gas to the atmosphere through a line 86.

Valves 14C and 14B in their de-energized states isolate the traps 60 and 60A from the system and the atmosphere until it can be removed for analysis of its components.

New hydrocarbon traps 60, 60A may be connected to lines 59, 61 and 62 and the system is ready for use again.

The apparatus as heretofore described desorbs gas from an earth sample. The desorbed gas is carried by a carrier gas to a dehydrating unit having a dehydrating agent. The gases are dehydrated at a temperature within a range of 20°–30°C. Light hydrocarbons are then trapped from the dehydrated gases. The trapped gases may be analyzed separately.

What is claimed is:

1. Apparatus for removing light hydrocarbons from an earthen sample comprising means for providing a carrier gas, means connected to the carrier gas means for desorbing a gas from the sample, which includes the light hydrocarbons, at a predetermined temperature for a predetermined time interval in the presence of the carrier gas, means connected to the desorbing means for dehydrating the gaseous mixture from the desorbing means, and means connected to the dehydrating means for substantially separating the light hydrocarbons from the dehydrated gaseous mixture, said separating means includes one adsorbent which substantially adsorbs the light hydrocarbons above methane in molecular weight, a second adsorbent which substantially adsorbs methane, means for passing the dehydrated gaseous mixture from the dehydrating means to a first adsorbent, second means for passing gas which was not adsorbed by the first adsorbent to a second adsorbent, and third means for passing gas which was not adsorbed by the second adsorbent.

2. Apparatus as described in claim 1 in which the carrier gas means provides the carrier gas at a predetermined rate so that the gaseous mixture moves through the apparatus at the predetermined rate.

3. Apparatus as described in claim 2 in which the desorbing means includes a device having a chamber connected to the carrier gas means and to the dehydrating means and in which the sample has been placed so that the desorbed gas commingles with and is carried away by the carrier gas to the dehydrating means, means for maintaining the chamber and the sample at the predetermined temperature, means connected to the device and receiving the carrier gas and responsive to a control signal for passing the carrier gas to the chamber in the device and for blocking the carrier gas during the absence of the control signal, and means connected to the passing-blocking means for providing the control signal for the predetermined time.

4. Apparatus as described in claim 3 in which the dehydrating means includes a dehydrating agent, and further comprising means connected to the dehydrating means for rejuvenating the dehydrating agent after the dehydration of the gaseous mixture.

5. Apparatus as described in claim 4 in which the dehydrating means includes means for maintaining the dehydrating agent at a second predetermined temperature during the dehydrating process, and means for maintaining the dehydrating agent at a third predetermined temperature during the rejuvenation process.

6. Apparatus as described in claim 5 in which the second predetermined temperature lies within the range of 20°–30°C and the third predetermined temperature lies within the range of 70°–90°C.

7. Apparatus as described in claim 6 in which the one adsorbent is activated alumina and the second adsorbent is activated charcoal.

8. A method for desorbing a gas, which includes light hydrocarbons from an earthen sample which comprises the following steps: desorbing the gas from the sample at a predetermined temperature for a predetermined time interval, providing a carrier gas to move the desorbed gas, dehydrating the two gases at a temperature within the range of 20° to 30°C and trapping a portion of the first gas in a first adsorbent which substantially adsorbs the light hydrocarbons above methane, adsorbing the methane in a second absorbent, and analyzing the trapped gases.

9. A method as described in claim 8 in which the dehydrating step is carried out using a dehydrating agent and further comprises rejuvenating the dehydrating agent.

* * * * *